United States Patent
Jang et al.

(10) Patent No.: US 11,960,322 B2
(45) Date of Patent: Apr. 16, 2024

(54) DUAL SLIDABLE ELECTRONIC DEVICE

(71) Applicant: Samsung Electronics Co., Ltd., Gyeonggi-do (KR)

(72) Inventors: Youngsang Jang, Gyeonggi-do (KR); Kukhwan Kim, Gyeonggi-do (KR); Kyungjin Lee, Gyeonggi-do (KR); Byungchan Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 228 days.

(21) Appl. No.: 17/567,387

(22) Filed: Jan. 3, 2022

(65) Prior Publication Data

US 2022/0121240 A1 Apr. 21, 2022

Related U.S. Application Data

(63) Continuation of application No. PCT/KR2020/003142, filed on Mar. 6, 2020.

(30) Foreign Application Priority Data

Jul. 12, 2019 (KR) ........................ 10-2019-0084786

(51) Int. Cl.
 *G06F 1/16* (2006.01)
(52) U.S. Cl.
 CPC .......... *G06F 1/1624* (2013.01); *G06F 1/1652* (2013.01)
(58) Field of Classification Search
 CPC .... G06F 1/1624; G06F 1/1652; G06F 1/1656; G06F 1/1681; G06F 1/1628
 See application file for complete search history.

(56) References Cited

U.S. PATENT DOCUMENTS

| | | | |
|---|---|---|---|
| 7,558,057 B1* | 7/2009 | Naksen | G06F 1/1613 |
| | | | 361/679.56 |
| 10,194,543 B2* | 1/2019 | Seo | G06F 1/1626 |
| 2014/0194165 A1 | 7/2014 | Iwang | |
| 2014/0211399 A1 | 7/2014 | O'Brien | |
| 2016/0147261 A1 | 5/2016 | Bohn et al. | |
| 2017/0038641 A1* | 2/2017 | Yamazaki | G02F 1/133308 |
| 2018/0081473 A1 | 3/2018 | Seo et al. | |

(Continued)

FOREIGN PATENT DOCUMENTS

| | | |
|---|---|---|
| CN | 108597373 A | 9/2018 |
| EP | 2 444 350 A1 | 4/2012 |

(Continued)

*Primary Examiner* — Rockshana D Chowdhury
(74) *Attorney, Agent, or Firm* — Cha & Reiter, LLC

(57) ABSTRACT

According to certain embodiments, an electronic device comprises: a housing surrounding at least a side surface of the electronic device; a flexible display exposed through a first surface of the electronic device facing a first direction, the exposed area varying based on the movement of the housing; and a flexible material exposed through a second surface of the electronic device facing a second direction opposite to the first direction, the exposed area varying based on the movement of the housing, wherein the width of the flexible material that is exposed through the second surface, expands in a third direction in accordance with the expansion of the width of the flexible display in the third direction, the third direction being substantially perpendicular to the first direction and the second direction.

14 Claims, 19 Drawing Sheets

(56) References Cited

U.S. PATENT DOCUMENTS

| | | | |
|---|---|---|---|
| 2018/0103550 A1 | 4/2018 | Seo et al. | |
| 2018/0198896 A1 | 7/2018 | Kang et al. | |
| 2018/0359869 A1 | 12/2018 | Kim et al. | |
| 2019/0297175 A1* | 9/2019 | Lin | G08B 3/10 |
| 2019/0315109 A1 | 10/2019 | Zhang et al. | |
| 2020/0022268 A1* | 1/2020 | Zuo | G06F 1/1681 |
| 2020/0177718 A1* | 6/2020 | Cao | G06F 1/1681 |
| 2020/0192434 A1* | 6/2020 | Huang | G06F 1/1681 |
| 2021/0315113 A1* | 10/2021 | Wittenberg | G06F 1/1652 |
| 2022/0308633 A1* | 9/2022 | Yin | G06F 1/1624 |
| 2022/0311849 A1* | 9/2022 | Jia | G06F 1/1675 |
| 2022/0317734 A1* | 10/2022 | Zhang | G06F 1/1618 |
| 2022/0342449 A1* | 10/2022 | Xu | G06F 1/1637 |

FOREIGN PATENT DOCUMENTS

| | | |
|---|---|---|
| KR | 10-2014-0079286 A | 6/2014 |
| KR | 10-2018-0031886 A | 3/2018 |
| KR | 10-2018-0039799 A | 4/2018 |
| KR | 10-2018-0135704 A | 12/2018 |
| WO | 2013/081622 A1 | 6/2013 |

* cited by examiner

FIG. 19
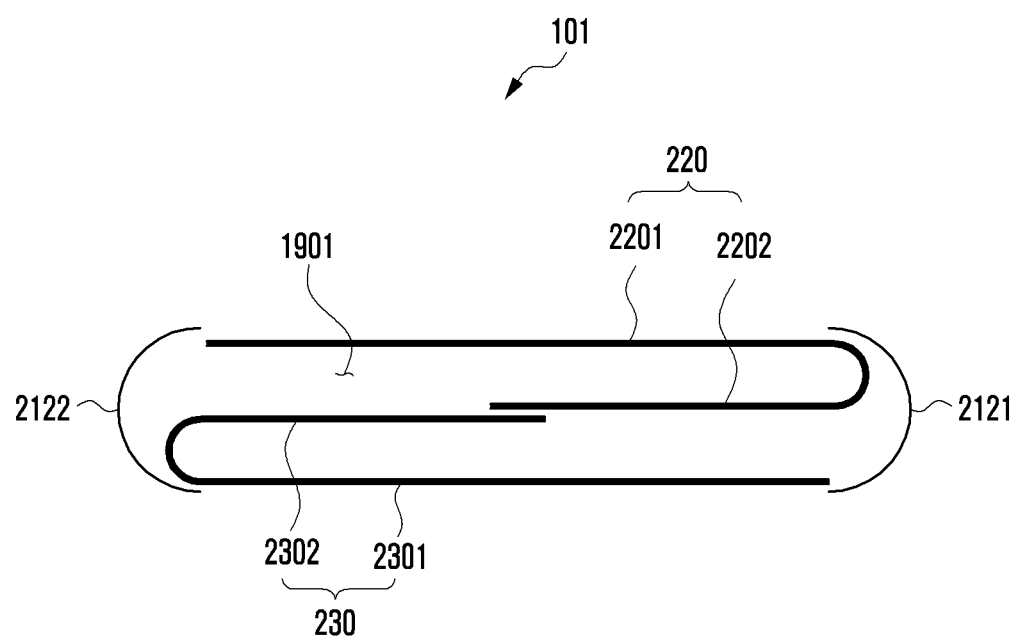
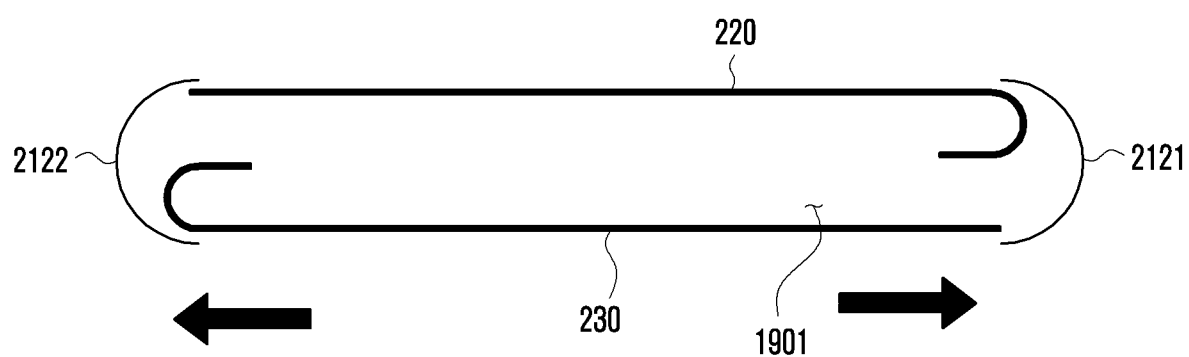

DUAL SLIDABLE ELECTRONIC DEVICE

CROSS REFERENCE TO RELATED APPLICATION

This application is a Continuation of and based on and claims priority under 35 U.S.C. § 120 to PCT International Application No. PCT/KR2020/003142, which was filed on Mar. 6, 2020, and claims priority to Korean Patent Application No. 10-2019-0084786, filed on Jul. 12, 2019, in the Korean Intellectual Property Office, the disclosures of which are incorporated by reference herein their entirety.

TECHNICAL FIELD

Certain embodiments of the disclosure relate to a dual slidable electronic device having a flexible material configured such that, in accordance with expansion of the width of a flexible display disposed on the front surface, the width of exposure of the flexible material on the back surface opposite to the front surface is expanded.

BACKGROUND

In line with development of display technologies, there has been development regrading electronic devices using flexible displays. Flexible displays can be folded, bent, rolled, or unfolded, and are thus expected to make important contributions to reducing the volume of electronic devices or changing the design thereof.

Display size and portability are almost diametrically opposing features. An increased display size improves the user experience, but at the expense of portability. A large display size can increase the dimensions of the electronic device, making it less portable. Meanwhile, to remain portable, the display size is restricted.

Flexible displays allow the benefit of a larger display size while maintaining portability. While the user is actually looking at the display, the user can make the display the maximum display size. While the user is actually moving with the electronic device, the user can reduce the display size to its minimum size.

There has recently been introduction of electronic devices that allow expansion of the length or the width of the flexible display.

However, the foregoing electronic devices have a stepped portion which decreases the level of consistency of exterior design and degrades the aesthetic appeal.

SUMMARY

According to certain embodiments, an electronic device comprises: a housing surrounding at least a side surface of the electronic device; a flexible display exposed through a first surface of the electronic device facing a first direction, the exposed area varying based on the movement of the housing; and a flexible material exposed through a second surface of the electronic device facing a second direction opposite to the first direction, the exposed area varying based on the movement of the housing, wherein the width of the flexible material that is exposed through the second surface, expands in a third direction in accordance with the expansion of the width of the flexible display in the third direction, the third direction being substantially perpendicular to the first direction and the second direction.

According to certain embodiments, an electronic device comprises a housing surrounding at least a side surface of the electronic device; a flexible display exposed through a first surface of the electronic device which faces a first direction, the exposed area varying based on the movement of the housing; and a flexible material exposed through a second surface of the electronic device which faces a second direction opposite to the first direction, the exposed area of the flexible material configured to vary based on the movement of the housing, wherein the width of the flexible material expands in a fourth direction substantially opposite to the third direction in accordance with the expansion of the width of the flexible display in the third direction, the third direction and the fourth direction being substantially perpendicular to the first direction and the second direction.

In order to solve the above-mentioned problem, certain embodiments of the disclosure may provide a dual slidable electronic device. The dual slidable electronic device can have a flexible material and be configured such that when the width is expanded, the width of exposure of the flexible material on the back surface is expanded. This improves the level of consistency of the exterior design and improves the aesthetic appeal.

A dual slidable electronic device according to certain embodiments of the disclosure has a flexible material configured such that, in accordance with expansion of the width of a flexible display disposed on the front surface, the width of exposure of the flexible material on the back surface opposite to the front surface is expanded, thereby improving the level of consistency of exterior design and improving the aesthetic appeal.

BRIEF DESCRIPTION OF DRAWINGS

FIG. 19 is a view schematically illustrating a cross section of an electronic device according to another embodiment.

DETAILED DESCRIPTION

Figure 1:
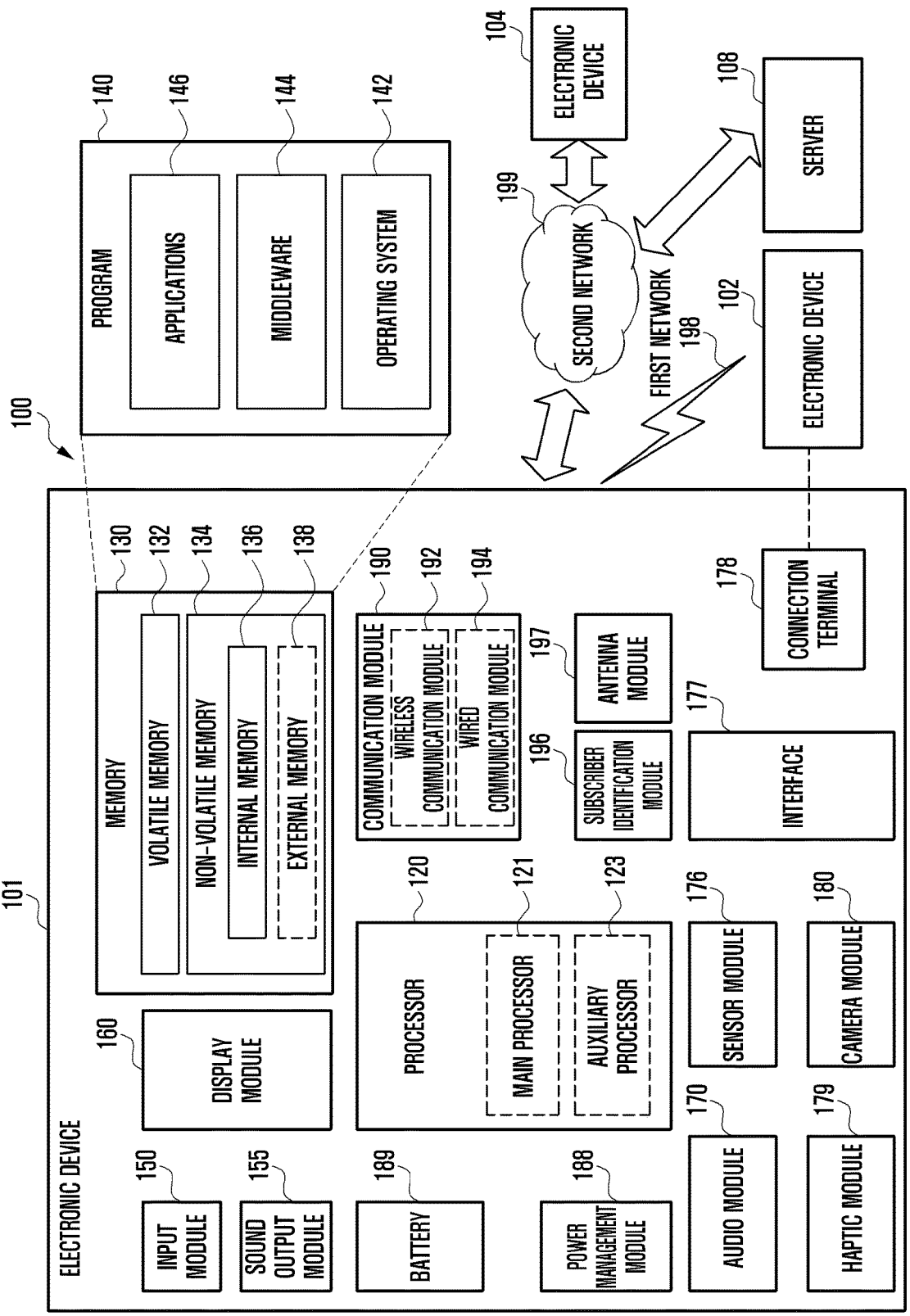
FIG. 1 is a block diagram of an electronic device of an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

In this disclosure, the term "processor" shall be understood to refer to both the singular and plural contexts.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

A dilemma can occur with the electronic device 101 between providing a pleasing user experience with a larger display size (larger display module 160) and portability. A flexible display allows the user to enjoy a larger display size, while maintaining portability.

An electronic device (e.g., 101 in FIG. 2 to FIG. 5) may include a housing 210 surrounding a side surface of the electronic device 101, and a flexible display 220 exposed through a first surface of the electronic device 101. The flexible display 220 faces a first direction. The exposed area of the flexible display 220 varies based on the movement of the housing 210. The flexible display 220 includes a flexible material 230 exposed through a second surface of the electronic device 101. The flexible material 230 faces a second direction. The second direction is opposite to the first direction. The exposed area varies based on the movement of the housing 210. Specifically, the width of the flexible material 230 may be expanded in a third direction in accordance with the expansion of the width of the flexible display 220 The third direction may be perpendicular to the first direction and the second direction.

The width of the flexible material 230 may contract in a fourth direction when the width of the flexible display 230 is contracted. The fourth direction is opposite to the third direction. The flexible material 230 may be one of Electroluminance (EL) lighting, a flexible display, a metallic film, fabric, or leather. The flexible display 220 may include a fixed area and an expansion area. The fixed area is fixedly exposed through the first surface of the electronic device 101 and is fixed regardless of the movement of the housing 210. The expansion area can be retracted into the inner space of the electronic device 101 or ejected from a part of the housing 210 by movement of the housing 210. The flexible material 230 may include a fixed area fixedly exposed through the second surface of the electronic device 101 and an expansion area retractable into the inner space or removable from a part of the housing 210. The flexible material is retracted or ejected based on the movement of the housing 210. A direction in which the expansion area of the flexible display 220 is ejected may be the same as a direction in which the expansion area of the flexible material 230 is ejected.

The inner space can be have a motor, a plate, a side holder, and a first rolling plate disposed therein. The plate can have a gear rail. The gear rail can be in contact with a gear of the motor. The side holder is coupled to the motor and can be moved by the rotation of the gear. The first rolling plate is configured to move the expansion area of the flexible display 220 when the side holder is moved. The first rolling plate may eject the expansion area of the flexible display 220 when the side holder moves in the third direction, and may retract the expansion area of the flexible display 220 into the inner space when the side holder moves in the fourth direction.

The inner space can also include a reel member pulling a wire connected to the expansion area of the flexible display 220 in the fourth direction. The inner space can also include a second rolling plate. The second rolling plate is configured to move the expansion area of the flexible material 230 when the side holder is moved. The second rolling plate may eject the expansion area of the flexible material 230 when the side holder moves in the third direction, and may retract the expansion area into the inner space when the side holder moves in the fourth direction.

The housing 210 may include a side member and a side cover. The side member including a first side member and a second side member facing each other, The side cover encases the side member at the outside. The side cover may include a first side cover forming a first side surface of the electronic device 101, a second side cover forming a second surface of the electronic device 101 facing the first side surface, a third side cover forming a third side surface. The third side surface connects one side of the first side surface and one side of the second side surface. The length of the third side surface expands in the third direction or contracts in the fourth direction. A fourth side cover forms a fourth side surface of the electronic device 101 facing the third side cover. The fourth side surface expands or contracts in the same direction in which the third side cover moves. The third side cover and the fourth side cover may include a plurality of coupling members which can be coupled to or detached from each other in a sliding manner. The plurality of coupling members may include a first coupling member and a second coupling member. The first coupling member and the second coupling member can be alternately arranged. The first coupling member may include a vertical support formed in a vertical direction and a plurality of horizontal supports extending in left and right directions from the vertical support. The second coupling member may include a vertical support formed in the vertical direction and a plurality of horizontal supports extending in left and right directions from the vertical support, and the horizontal supports of the first coupling member may move between the horizontal supports of the second coupling member in a sliding manner.

A step may be formed in at least one of the horizontal supports of the second coupling member. A protrusion which comes into contact with the step when the width of the flexible display 220 expands in the third direction may be formed at the first coupling member. A fixing pin may extend through the horizontal support of the second coupling member and a groove formed at the horizontal support of the first coupling member.

Figure 2:
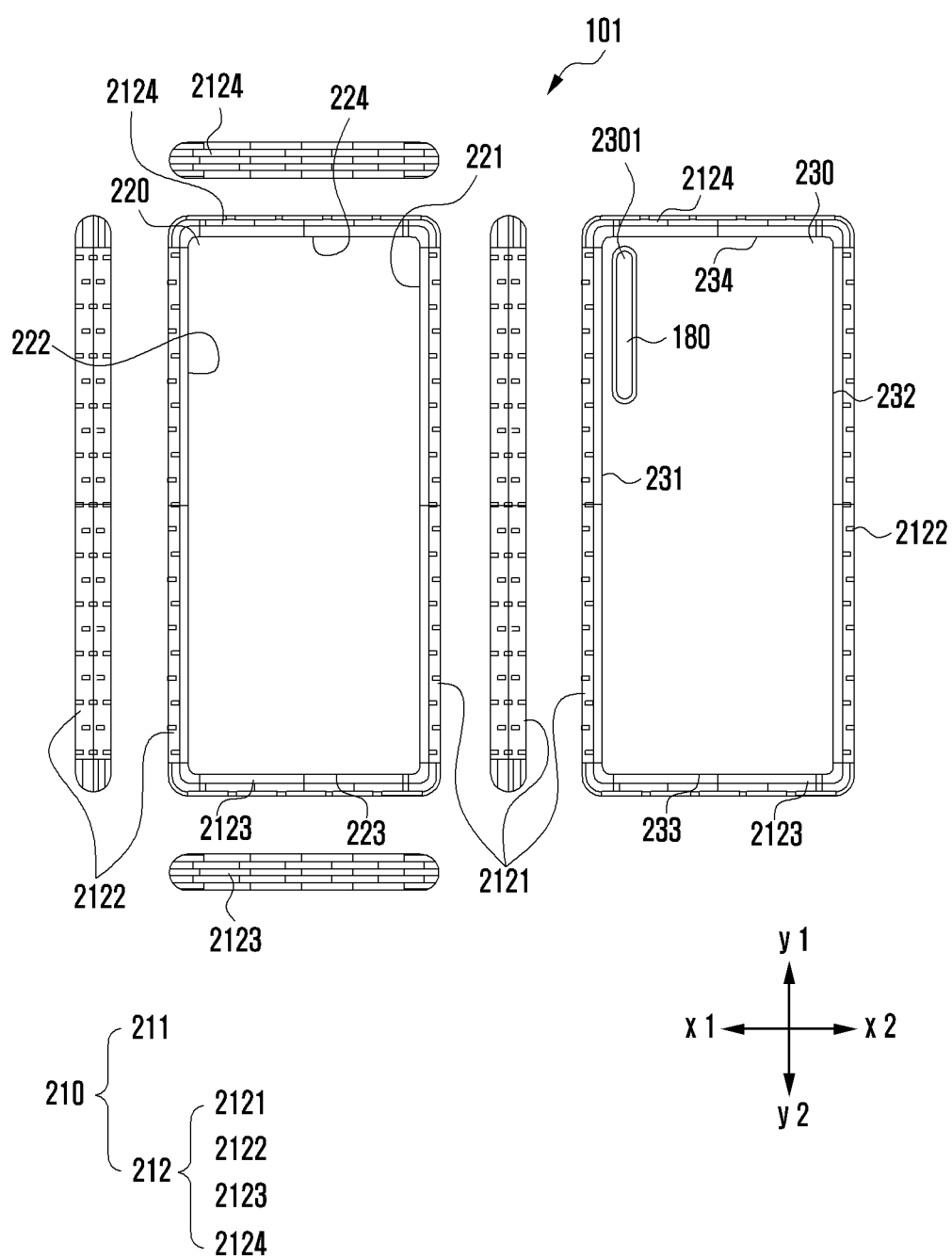
FIG. 2 is a view illustrating a contracted state in which a part of a flexible display of an electronic device according to certain embodiments of the disclosure is retracted into the electronic device.
Figure 3:
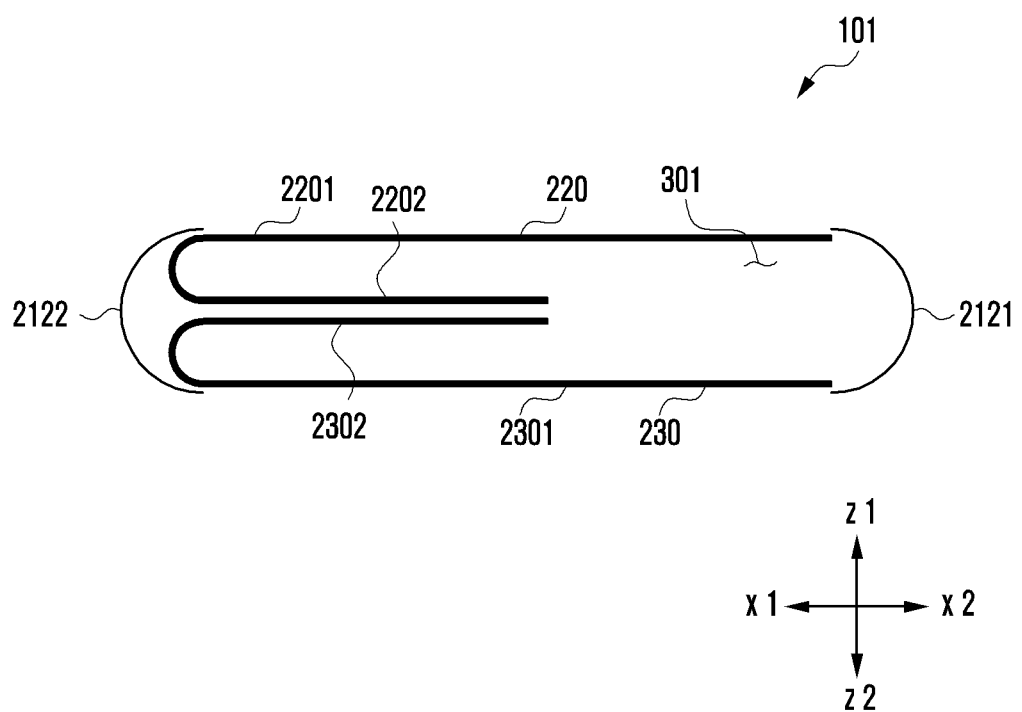
FIG. 3 is a view schematically illustrating a cross section when an electronic device according to certain embodiments is in a contracted state.

FIG. 2 is a view illustrating a contracted state in which a part of a flexible display of an electronic device according to certain embodiments of the disclosure is retracted into the electronic device. FIG. 3 is a view schematically illustrating a cross section when an electronic device according to certain embodiments is in a contracted state.

Referring to FIG. 2, an electronic device 101 (e.g., an electronic device 101 in FIG. 1) according to certain embodiments may include a housing 210 surrounding a side surface of the electronic device 101, a flexible display 220 (or a first display) (e.g., a display device 160 in FIG. 1) exposed through a front surface of the electronic device 101, and a flexible material 230 exposed toward a rear surface of the electronic device 101.

In this document, a surface in which the flexible display 220 is exposed is the front surface of the electronic device 101, and the surface opposite to the front surface is considered a rear surface of the electronic device 101.

Further, a surface surrounding a space between the front surface and the rear surface is considered a side surface of the electronic device 101. The flexible display 220 may be exposed in a first direction which the front surface of the electronic device 101 faces, and the flexible material 230 may be exposed in a second direction (the second direction is opposite to the first direction) which the rear surface of the electronic device 101 faces.

The housing 210 surround a space between the front surface and the rear surface of the electronic device 101. The housing 210 may form the side surface of the electronic device 101. The housing 210 may include a side member 211 surrounding the space between the front surface and the rear surface at the inside of the electronic device 101, and a side cover 212 surrounding the side member 211 at the outside thereof. According to an embodiment, only the side cover 212 the housing 210 may be visually exposed and the side member 211 may be obscured by the side cover 212.

According to certain embodiments, the side cover 212 may include first to fourth side covers 2121, 2122, 2123, and 2124 surrounding boundary areas 221, 222, 223, and 224 when viewing the flexible display 220 from above. The side cover 212, when viewing the flexible display 220 from above, may include the first side cover 2121, second side cover 2122, third side cover 2123, and a fourth side cover 2124. The first side cover 2121 can be adjacent to the first boundary area 221 of the flexible display 220 (e.g., a right boundary of the flexible display 220 in FIG. 2) to form a first side surface of the electronic device 101. The second side cover 2122 can be adjacent to the second boundary area 222 (e.g., a left boundary of the flexible display 220 in FIG. 2) facing the first boundary area 221 of the flexible display 220 to form a second side surface of the electronic device 101. The third side cover 2123 can be adjacent to the third boundary area 223 (e.g., a lower boundary of the flexible display 220 in FIG. 2) for connecting the first boundary area 221 and the second boundary area 222 at one side of the first boundary area 221 of the flexible display 220 (e.g., a lower end of the first boundary area in FIG. 2) to form a third side surface of the electronic device 101. The fourth side cover 2124 can be adjacent to the fourth boundary area 224 (e.g., an upper boundary of the flexible display 220 in FIG. 2) facing the third boundary area 223 of the flexible display 220 to from a fourth side surface of the electronic device 101.

The housing 210 may form a space in which various components of the electronic device 101 (e.g., a printed circuit board, a camera module (e.g., a camera module 180 in FIG. 1), an antenna module (e.g., an antenna module 197 in FIG. 1), a sensor module (e.g., a sensor module 176 in FIG. 1), or a battery (e.g., a battery 189 in FIG. 1)) can be arranged through a structure in which the components are coupled to one another.

The flexible display 220 may be disposed in the space surrounded by the housing 210. The flexible display 220 may occupy substantially most of the front surface of the electronic device 101. The front surface of the electronic device 101 may be composed of a flexible display 220 and a partial area of the housing 210 adjacent to the boundary areas 221, 222, 223, and 224 of the flexible display 220.

A sensor area (not illustrated) may be provided at the front surface of the electronic device 101 through a part of the flexible display 220 or at a partial area adjacent to the boundary areas 221, 222, 223, and 224 of the flexible display 220. The sensor area may be disposed at at least one corner when viewing the front surface of the electronic device 101 from above. Components for performing various functions may be arranged in the sensor area wherein at least a part of the components may be arranged at the front surface of the electronic device 101 to be exposed. The components, may include, for example, at least one of a front camera device, a receiver, a proximity sensor, an illuminance sensor, an iris recognition sensor, an ultrasonic sensor, or an indicator. The components may include, for example, at least one sensor disposed under the flexible display 220 or disposed in the flexible display 220. The at least one sensor may include, for example, at least a part of a fingerprint sensor, a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, or an illuminance sensor.

The flexible display 220 may mean a display at least a partial area of which can be deformed into a flat surface of a curved surface. In an embodiment, the area of the flexible display 220, which is exposed based on the movement of a part of the housing 210, may vary.

Referring to FIG. 3, in an embodiment, the flexible display 220 may include a fixed area 2201 and an expansion area 2202. The fixed area 2201 is fixedly exposed through the front surface of the electronic device 101 and is fixed regardless of the movement of the housing 210. The expansion area 2202 can be retracted into a space 301 surrounded by the housing 210 or ejected from a part of the housing 210 based on the movement of the housing 210. For example, as illustrated in FIG. 3, the expansion area 2202 of the flexible display 220 may be disposed to be adjacent to a second side cover 2122. The expansion area 2202 can be ejected from the second side cover 2122 when the second side cover 2122 moves in a third direction (e.g., an x1 direction in FIG. 3), or retracted into the space 301 when the second side cover 2122 moves in a fourth direction (e.g., an x2 direction in FIG. 3).

According to certain embodiments, the flexible material 230 may be disposed under a space (e.g., 301 in FIG. 3) surrounded by the housing 210. The flexible material 230 may be disposed to occupy substantially most of the rear surface of the electronic device 101. The rear surface of the electronic device may be composed of the flexible material 230 and a partial area of the housing adjacent to the boundary areas (e.g., 231, 232, 233, and 234 in FIG. 2) of the flexible material.

The flexible material 230 may be a material at least a partial area of which can be deformed into a flat surface or a curved surface. For example, the flexible material 230 may be one of, but not limited to, an EL lighting, a flexible display (e.g., a second display), a metallic film, fabric, or leather.

The area of the flexible material 230, which is exposed based on the movement of a part of the housing 210, may vary.

Referring to FIG. 3, in an embodiment, the flexible material 230 may include a fixed area 2301 and an expansion area 2302. The fixed area 230 is fixedly exposed through the rear surface of the electronic device 101 and is fixed regardless of the movement of the housing 210. The expansion area 2302 can be retracted into space 301 or ejected based on the movement of the housing 210.

According to an embodiment, a direction in which the expansion area 2302 of the flexible display 230 is ejected may be identical to a direction in which the expansion area 2202 of the flexible material 220 is ejected. A direction in which the expansion area 2302 of the flexible material 230 retracts may be identical to a direction in which the expansion area 2202 of the flexible display 220 retracts. Accordingly, the width of the flexible material 230 may expand in the third direction (e.g., the x1 direction in FIG. 3) in accordance with the expansion of the width of the flexible display 220 in the third direction (e.g., the x1 direction in FIG. 3). For example, as illustrated in FIG. 3, the expansion area 2202 of the flexible display 220 may be disposed to be adjacent to the second side cover 2122 forming the second side surface of the electronic device 101, ejected from the second side cover 2122 based on the fact that the second side cover 2122 moves in the third direction (e.g., the x1 direction in FIG. 3), and retracted into the space 301 based on the fact that the second side cover 2122 moves in the fourth direction (e.g., the x2 direction in FIG. 3).

According to certain embodiments, the flexible material 230 may include an opening for exposing the components of the electronic device through the rear surface. The components may include, for example, at least one of a rear camera device, a flash, or a proximity sensor.

Figure 4:
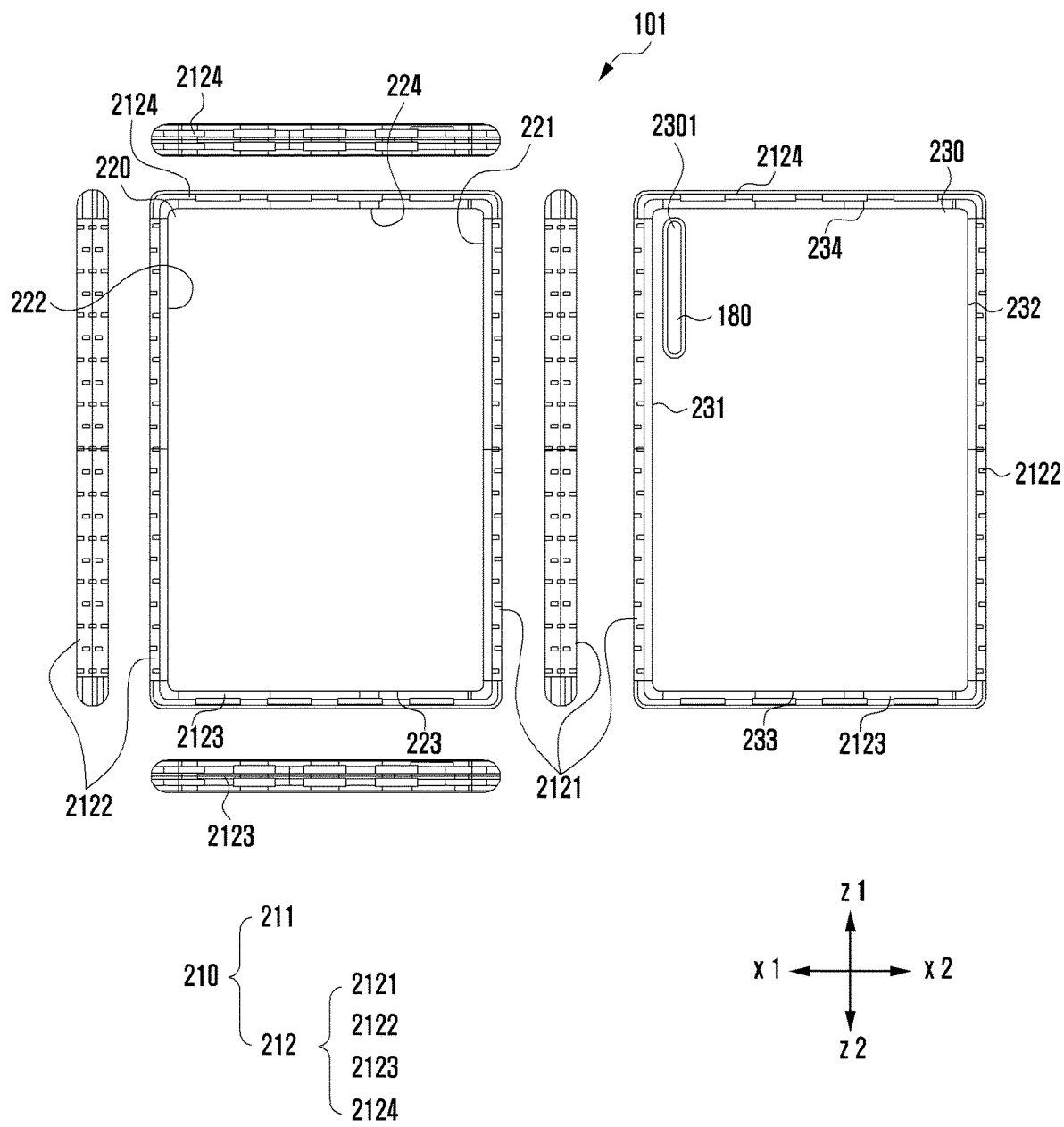
FIG. 4 is a view illustrating an expanded state in which an expansion area of a flexible display of an electronic device according to certain embodiments of the disclosure is ejected to the outside of the electronic device.
Figure 5:
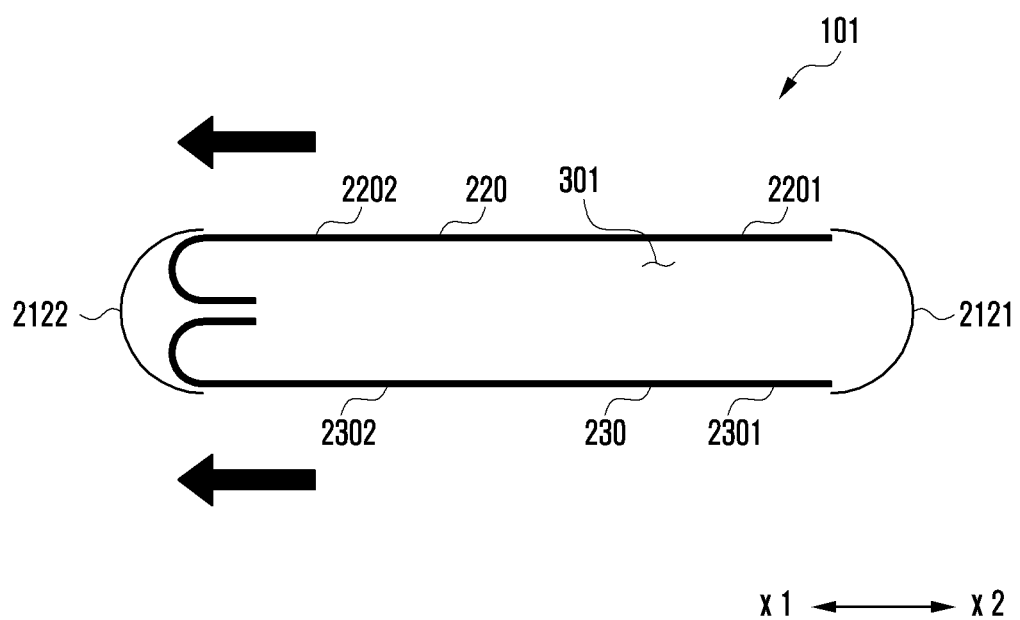
FIG. 5 is a view schematically illustrating a cross section when an electronic device according to certain embodiments is in an expanded state.

FIG. 4 is a view illustrating an expanded state in which an expansion area of a flexible display of an electronic device according to certain embodiments of the disclosure is ejected to the inside of the electronic device. FIG. 5 is a view schematically illustrating a cross section when an electronic device according to certain embodiments is in an expanded state.

Referring to FIG. 4, a housing (e.g., 210 in FIG. 2) according to certain embodiments may move by driving a motor (e.g., 281 in FIG. 6) disposed in the electronic device (e.g., 101 in FIG. 1), and the width of the flexible display 220 and the width of the flexible material 230 may extend based on the movement of the housing 210. The third side cover (e.g., 2123 in FIG. 2) may be coupled to one side of the first side cover 2121 (e.g., a lower part of the first side cover 2121 in FIG. 4) and one side of the second side cover 2122 (e.g., a lower part of the second side cover 2122 in FIG. 4), and the length thereof may be expanded in the third direction (e.g., the x1 direction in FIG. 2) by the drive of the motor (e.g., 281 in FIG. 6).

The length of the third side cover 2123 may be contracted in the fourth direction (e.g., the x2 direction in FIG. 2) opposite to the third direction (e.g., the x1 direction in FIG. 2) by the drive of the motor after the length thereof is expanded in the third direction (e.g., the x1 direction in FIG. 2), and thus the width of the flexible display 220 and the width of the flexible material 230 may also be contracted.

The fourth side cover (e.g., 2124 in FIG. 2) may be expanded or contracted in a direction identical to that of the third side cover 2123 in accordance with the movement of the third side cover 2123. For example, the fourth side cover 2124 may be coupled to the other side of the first side cover 2121 (e.g., an upper part of the first side cover 2121 in FIG. 4) and the other side of the second side cover 2122 (e.g., an upper part of the second side cover 2122 in FIG. 4), and the length thereof may be expanded in the third direction (e.g., the x1 direction in FIG. 2) by the drive of the motor (e.g., 281 in FIG. 6). The length of the fourth side cover 2124 may be contracted in the fourth direction (e.g., the x2 direction in FIG. 2) opposite to the third direction (e.g., the x1 direction in FIG. 2) by the drive of the motor after the length thereof is expanded in the third direction (e.g., the x1 direction in FIG. 2).

The length of the first side cover 2121 and the length of the second side cover 2122 may be fixed while the lengths of the third side cover 2123 and the fourth side cover 2124 are expanded or contracted.

Referring to FIG. 5, in an embodiment, when the length of the third side cover 2123 or the fourth side cover 2124 is expanded, the expansion area (e.g., 2202 in FIG. 3) of the flexible display 220 which has been contracted in the inner space (e.g., 301 in FIG. 3) of the electronic device 101 may be ejected from the second side cover 2122 at the front surface of the electronic device 101. In an embodiment, the expansion area (e.g., 2302 in FIG. 3) of the flexible material 230 may be ejected from the second side cover 2122 at the rear surface of the electronic device 101 in accordance with the expansion area 2202 of the flexible display 220 being ejected.

Figure 6:
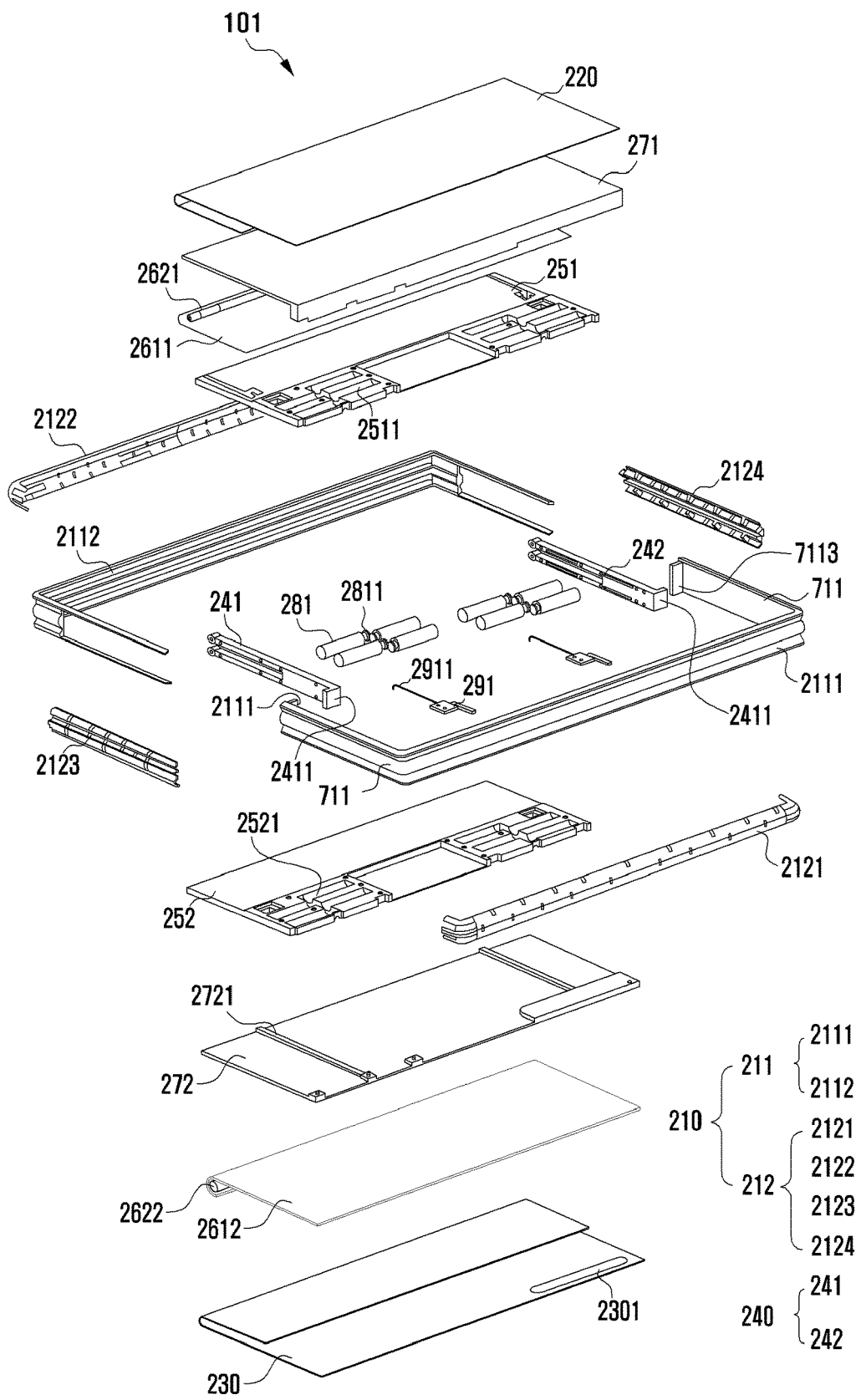
FIG. 6 is an exploded perspective view of an electronic device according to certain embodiments of the disclosure.
Figure 7:
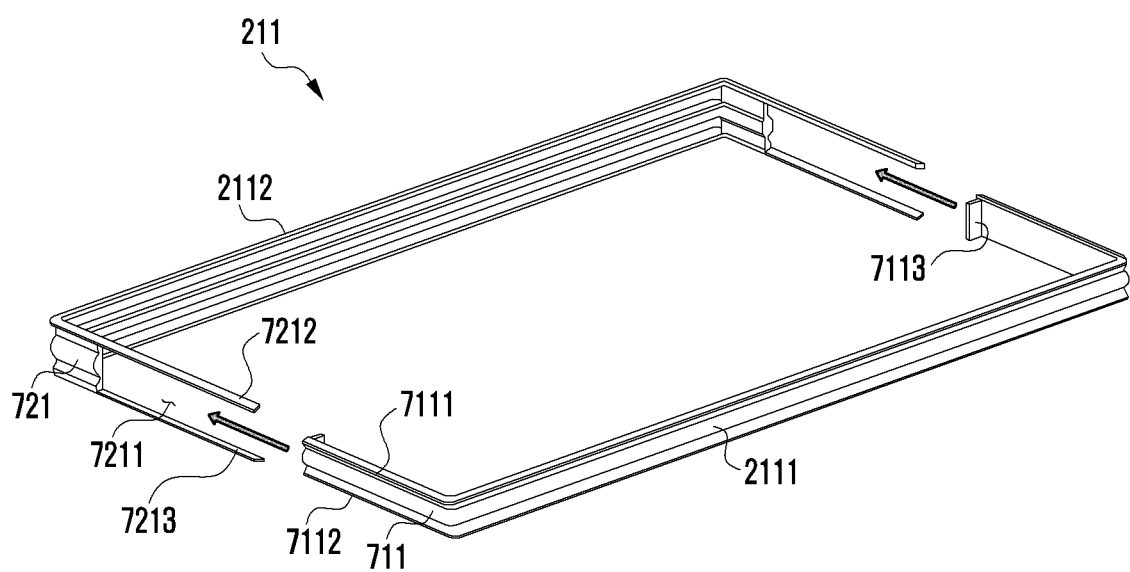
FIG. 7 is an enlarged perspective view of a side member according to certain embodiments of the disclosure.
Figure 8:
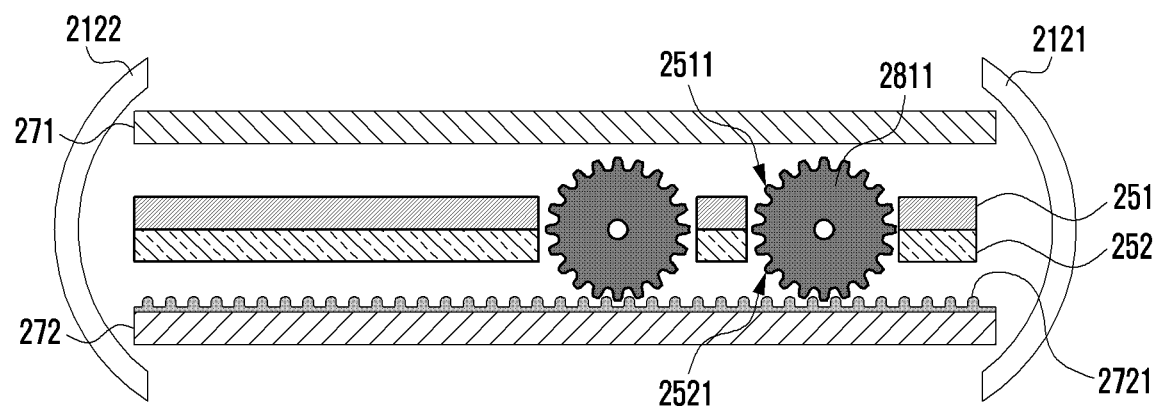
FIG. 8 is a view schematically illustrating a form in which a gear of a motor is in contact with a gear rail when an electronic device according to certain embodiments is in a contracted state.
Figure 9:
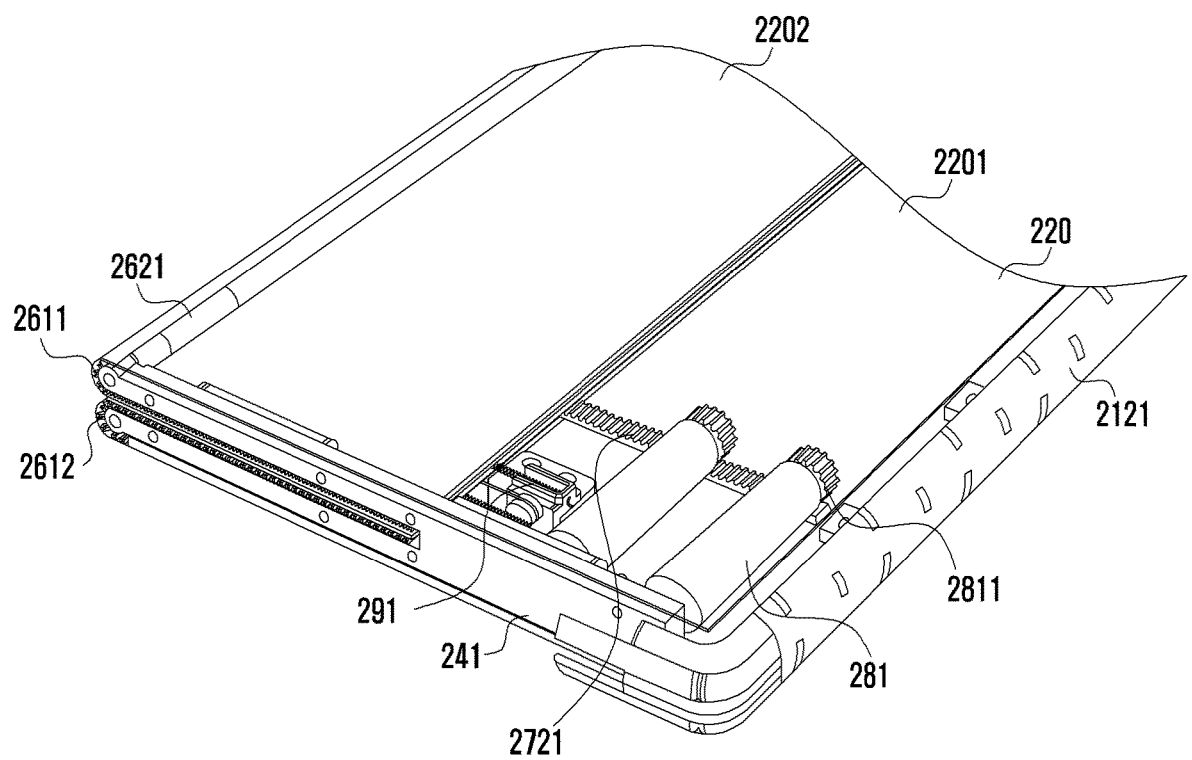
FIG. 9 is a view illustrating an arrangement state of internal components of an electronic device according to certain embodiments when the electronic device is in a contracted state.
Figure 10:
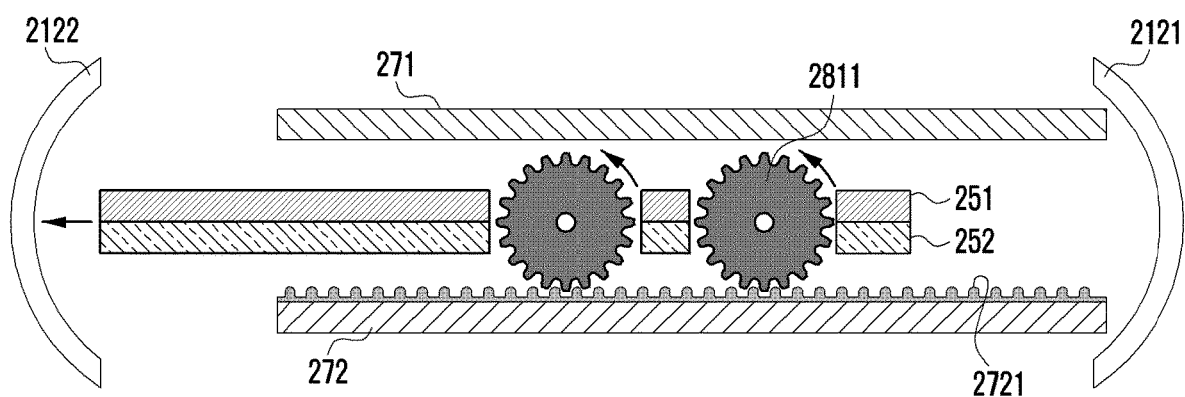
FIG. 10 is a view schematically illustrating a form in which a gear of a motor is in contact with a gear rail when an electronic device according to certain embodiments is in an expanded state.
Figure 11:
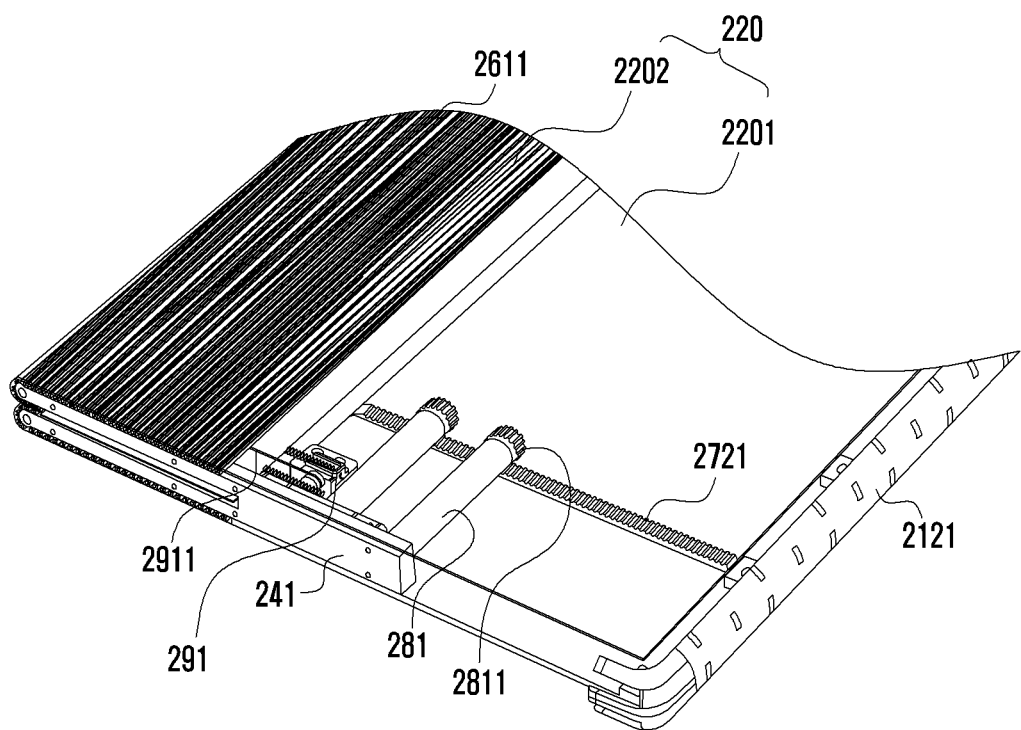
FIG. 11 is a view illustrating an arrangement state of internal components of an electronic device according to certain embodiments when the electronic device is in an expanded state.

FIG. 6 is an exploded perspective view of an electronic device according to certain embodiments of the disclosure. FIG. 7 is an enlarged perspective view of a side member according to certain embodiments of the disclosure. FIG. 8 is a view schematically illustrating a form in which a gear of a motor is in contact with a gear rail when an electronic device according to certain embodiments is in a contracted state. FIG. 9 is a view illustrating an arrangement state of internal components of an electronic device according to certain embodiments when the electronic device is in a contracted state. FIG. 10 is a view schematically illustrating a form in which a gear of a motor is in contact with a gear rail when an electronic device according to certain embodiments is in an expanded state. FIG. 11 is a view illustrating an arrangement state of internal components of an electronic device according to certain embodiments when the electronic device is in an expanded state. Hereinafter, the coupling structure of the electronic device 101 according to certain embodiments will be more specifically described with reference to FIG. 6 to FIG. 11.

Referring to FIG. 6, in certain embodiments, the electronic device (e.g., 101 in FIG. 1) may include a housing (e.g., 210 in FIG. 2). The housing may include the side member 211 and the side member 212 (e.g., 212 in FIG. 2), the flexible display (e.g., 220 in FIG. 2), a first plate 271 configured to support the flexible display 220 from below, a first rolling plate 2611 configured to guide the expansion area (e.g., 2202 in FIG. 3) of the flexible display 220, a first support member 251, a second support member 252 coupled to the first support member 251, the flexible material 230, a second plate 272 configured to support the flexible material 230, a second rolling plate 2612 configured to guide the expansion area (e.g., 2302 in FIG. 3) of the flexible material 230, a motor 281 coupled to the first support member 251 or the second support member 252 to generate power for moving the housing 210, or a side holder 240 configured to move the housing 210 by using the power of the motor 281.

The side member 211 of the housing 210 may include a first side member 2111 and a second side member 2112 which face each other. The side member 211 may include the first side member 2111 coupled to the first side cover 2121 to fix the movement thereof, and the second side member 2112 coupled to the second side cover 2122 and moved by the side holder 240 in a sliding manner.

Referring to FIG. 7, in an embodiment, the first side member (e.g., 2111 in FIG. 6) may include a bent surface 711 bent in a direction toward the second side member (e.g., 2112 in FIG. 6), and the second side member 2112 may include a bent surface 721 bent in a direction toward the first side member 2111. A part of the bent surface 721 of the second side member 2112 may move along a surface 7111 and 7112 of the bent surface 711 of the first side member 2111 in a sliding manner. For example, the bent surface 721 of the second side member 2112 may include an opening 7211 into which the bent surface 711 of the first side member 2111 is inserted in a sliding manner when the electronic device 101 is in the contracted state (e.g., the state in FIG. 2), a first support 7212 provided above the opening 7211 to move along a bent surface 711 of the first side member 2111 in a sliding manner, or a second support 7213 provided under the opening 7211 to move along a lower surface 7112 of the first side member 2111 in a sliding manner.

Referring to FIG. 8 and FIG. 9, in an embodiment, the motor 281 may be fixedly coupled to an inner surface of a side holder 241 (e.g., 241 in FIG. 6). Accordingly, the side holder 241 may move the second side member 2112 by using power of the motor 281 in a sliding manner. In an embodiment, the motor 281 may be coupled to the first support member 251 or the second support member 252 and may include a gear 2811 formed in a serrated shape. In an embodiment, the gear 2811 of the motor 281 is in contact with a gear rail (e.g., 2721 in FIG. 6) formed on a surface of the first plate 271 or the second plate 272 to rotate so as to move the side holder 241. In an embodiment, the first support member 251 and/or the second support member 252 may have a through hole (e.g., 2511 and 2521 in FIG. 6) formed therein to accommodate the motor 281, and the gear 2811 of the motor 281 may be in contact with a gear rail (not illustrated) formed on a rear surface of the first plate 271 (e.g., a lower surface of the first plate 271 in FIG. 6) and/or a gear rail (e.g., 2721 in FIG. 6) formed on a front surface of the second plate 272 (e.g., an upper surface of the second plate 272 in FIG. 6) through the through hole 2511 and 2521.

Referring to FIG. 10 and FIG. 11, in an embodiment, when the gear 2811 of the motor (e.g., 281 in FIG. 6) rotates in a first rotation direction (e.g., a counterclockwise direction), the display may expand. The motor 281, and the first support member 251 and the second support member 252 to which the motor 281 is coupled may move along the gear rail 2721 in the third direction (e.g., the x1 direction in FIG. 2) from the first side member 2111 toward the second side member 2112, and the side holder 241 (e.g., 241 in FIG. 6) may also move in the third direction (e.g., the x1 direction in FIG. 2, left) in accordance with the movement of the first support member 251 and the second support member 252. In an embodiment, the side holder 241 may push the second side member 2112 while moving in the third direction (e.g., the x1 direction in FIG. 2), and the second side member 2112 may be moved by the pushing power of the side holder 241 in a sliding manner. In an embodiment, when the second side member 2112 moves in the third direction (the x1 direction in FIG. 2), the third side surface of the electronic device 101 may be encased while the length of the third side cover 2123 is expanded, and the fourth side surface of the electronic device 101 may be encased while the length of the fourth side cover 2124 is expanded.

When the gear 2811 of the motor 281 rotates in a second rotation direction (e.g., a clockwise direction), the display may retract. The motor 281 may move along the gear rail 2721 in the fourth direction (the x2 direction in FIG. 2) (e.g., the fourth direction x2 in FIG. 2) from the second side member 2112 toward the first side member 2111, and the side holder 241 to which the motor 281 is coupled may also move in the fourth direction (the x2 direction in FIG. 2) in accordance with the movement of the motor 281. The side holder 241 may pull the side member 2112 while moving in the fourth direction (the x2 direction in FIG. 2) and the second side member 2112 may be moved by the pulling power of the side holder 241 in a sliding manner.

In an embodiment, the motor 281 and the side holder 241 may be arranged only at one side of the electronic device 101 (e.g., a part adjacent to the third side cover 2123 in FIG. 6).

In another embodiment, the motor 281 and the side holder 241 may be additionally provided not only at one side of the electronic device 101 but also at the other side of the electronic device 101 (e.g., a part adjacent to the fourth side cover 2124 in FIG. 6). For example, as illustrated in FIG. 6, the side holder 240 may include a first side holder 241 disposed to be adjacent to the third side cover 2123, and a second side holder 242 disposed to be adjacent to the fourth side cover 2124. In certain embodiments, the second side holder 242 and a motor coupled to the second side holder 242 may be omitted.

The motor 281, the first support member 251, the second support member 252, and the gear rail 2721 are not limited to the shape and assembly illustrated herein, but may be implemented by other shapes or other combinations and/or assemblies of components. For example, the number of the motor 281 or the arrangement of the motor 281 is not limited to the shape illustrated herein, but can be modified or changed.

According to certain embodiments, the third side cover 2123 and the fourth side cover 2124 may include a plurality of coupling members (e.g., 1510 and 1520 in FIG. 15) which can be coupled to or detached from one another in a sliding manner, which will be specifically described later with reference to FIG. 15 to FIG. 18.

Referring to FIG. 6, in an embodiment, a bent protrusion 2411 may be formed at one side of the side holder 241 (e.g., a right end of the side holder 241 and 242 in FIG. 6), and a protrusion 7113 (e.g., 7113 in FIG. 7) may also be formed at the bent surface 711 (e.g., 711 in FIG. 7) of the first side member 2111. In an embodiment, when the side holder 241 and 242 moves in the third direction (e.g., the x1 direction in FIG. 2), the protrusion 2411 of the side holder 241 and 242 may come into contact with the protrusion 7113 of the first side member 2111 to function as a stopper.

Figure 12:
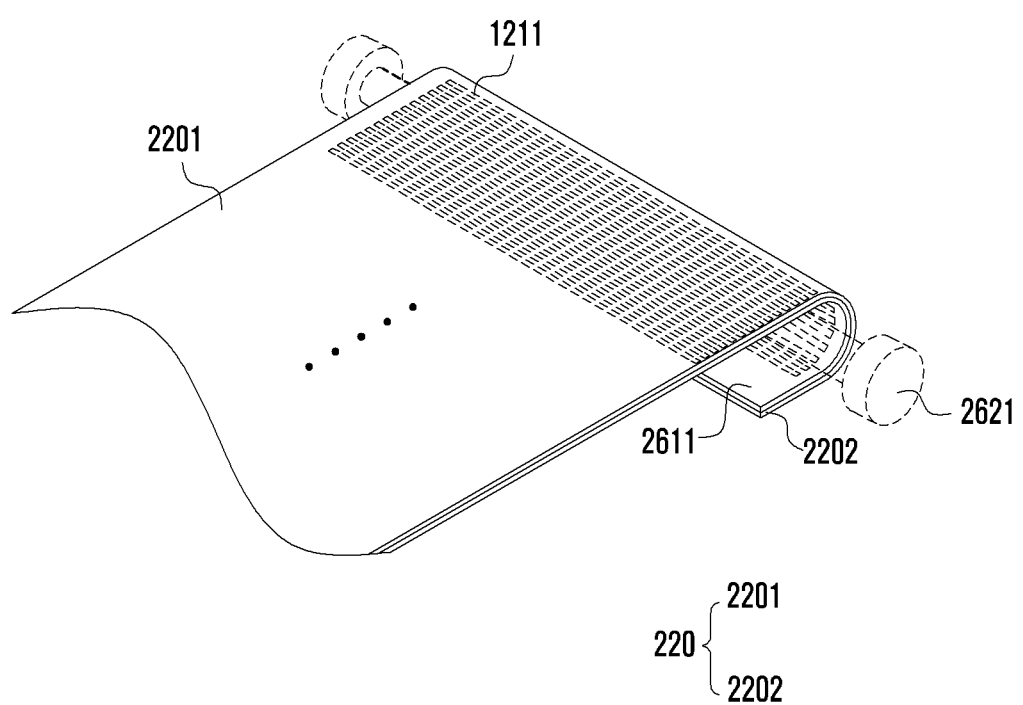
FIG. 12 is a view schematically illustrating a coupling structure of a first rolling plate or a second rolling plate according to an embodiment.

FIG. 12 is a view schematically illustrating a coupling structure of a first rolling plate or a second rolling plate according to an embodiment.

Referring to FIG. 12, in an embodiment, the first rolling plate 2611 (e.g., 2611 in FIG. 6) may be attached to the surface of the expansion area (e.g., 2202 in FIG. 3) of the flexible display 220 to support the expansion area 2022. The first rolling plate 2611 may surround a first roller 2621 with a surface opposite to the surface which is attached to the flexible display 220, and may be provided with a plurality of slits 1211 or a plurality of multi-joint hinges (not illustrated) to be moved by the rotation of the first roller 2621. The plurality of slits or multi-joint hinges allows the expansion area 2022 of the flexible display 220 to deform.

The first roller 2621 may be coupled to an end part of the side holder 241, which is adjacent to the second side cover (e.g., 2122 in FIG. 6), and may rotate in the first rotation direction (e.g., the counterclockwise direction) in accordance with the side holder 241 moving in the third direction (e.g., the x1 direction in FIG. 2). When the first roller 2621 rotates in the first rotation direction, the first rolling plate 2611 is moved by friction force between the first roller 2621 and the first rolling plate 2611, and the expansion area 2202 of the flexible display 220 may be ejected to the front surface of the electronic device 101 by the movement of the first rolling plate 2611.

In an embodiment, the first roller 2621 may rotate in the second rotation direction (e.g., the clockwise direction) in accordance with the side holder 241 moving in the fourth direction (e.g., the x2 direction in FIG. 2). In an embodiment, when the first roller 2621 rotates in the second rotation direction, the first rolling plate 2611 may be moved by friction force between the first roller 2621 and the first rolling plate 2611, and the expansion area 2202 of the flexible display 220 may be retracted into the inner space (e.g., 301 in FIG. 3) of the electronic device 101 by the movement of the first rolling plate 2611.

In an embodiment, the coupling structure of the second rolling plate 2612 may be substantially identical or similar to the coupling structure of the first rolling plate 2611. For example, when a second roller 2622 rotates in accordance with the movement of the side holder 241, the second rolling plate 2612 is moved, and the expansion area 2302 of the flexible material 230 may be ejected or retracted into the inner space (e.g., 301 in FIG. 3) of the electronic device 101 by the movement of the second rolling plate 2612.

Figure 13:
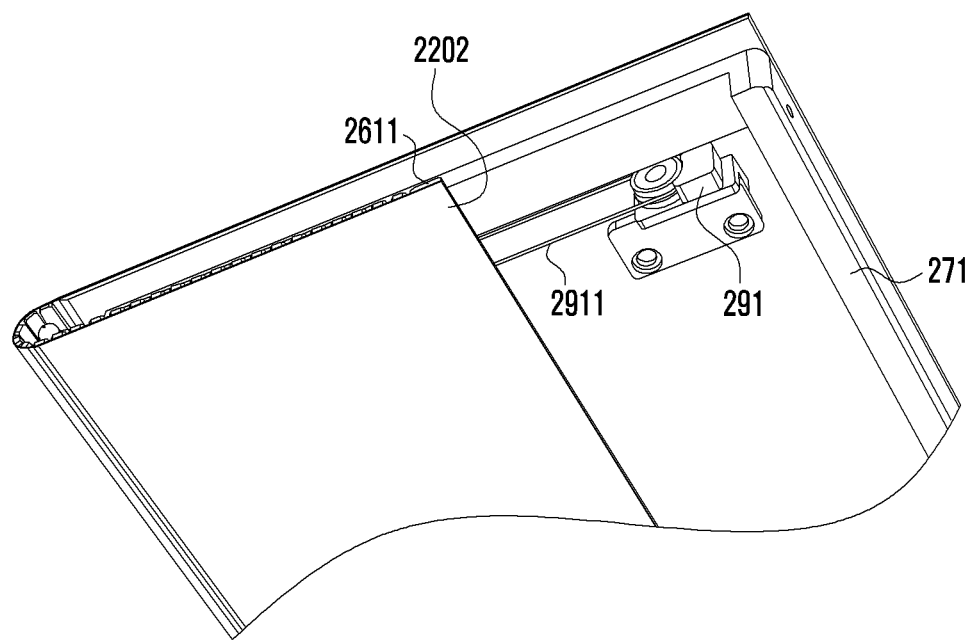
FIG. 13 is a rear perspective view of a first plate according to an embodiment.
Figure 14:
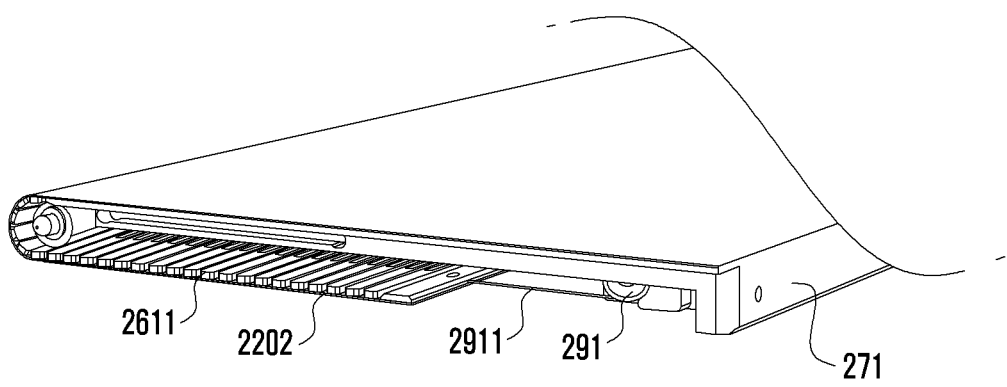
FIG. 14 is a side perspective view of a first plate according to an embodiment.

FIG. 13 is a rear perspective view of a first plate according to an embodiment. FIG. 14 is a side perspective view of a first plate according to an embodiment.

Referring to FIG. 13 and FIG. 14, in an embodiment, the electronic device 101 may include a wire 2911 and a reel member 291. The wire can be connected to a part of the expansion area (e.g., 2202 in FIG. 3) of the flexible display 220 at the rear surface of the first plate 271 (e.g., the lower surface of the first plate 271 in FIG. 6). The reel member 291 can pull the wire 2911 in the third direction (e.g., the x1 direction in FIG. 2). In an embodiment, the reel member 291 may be fixed to a part of the first support member (e.g., 251 in FIG. 6) or the second support member (e.g., 252 in FIG. 6). In an embodiment, the reel member 291 may pull the wire 2911 in the third direction (e.g., the x1 direction in FIG. 2) keep the flexible display 220 flat when the electronic device 101 is in the contracted state (e.g., the state in FIG. 2) or the expanded state (e.g., the state in FIG. 4).

The wire 2911 may be connected to a part of the first rolling plate (e.g., 2611 in FIG. 6), and, in this case, the reel member 291 may pull the wire 2911 to increase the flatness of the first rolling plate 2611 and the flatness of the flexible display 220.

According to certain embodiments, although not illustrated, the electronic device 101 may further include a reel member and a wire configured to increase the flatness of the flexible material 230 by pulling a part of the flexible material 230 or a part of the second rolling plate 2612. For example, the electronic device 101 may further include a wire connected to a part of the expansion area (e.g., 2302 in FIG. 4) of the flexible material 230, and a reel member configured to pull the wire in a direction toward the first side cover 2121.

The third side cover 2123 and the fourth side cover 2124 can included coupling members 1510 and 1520. The coupling members 1510 and 1520 mete with each other. The coupling members 1510 and 1520 separate to expand the display and compress to retract the display.

Figure 15:
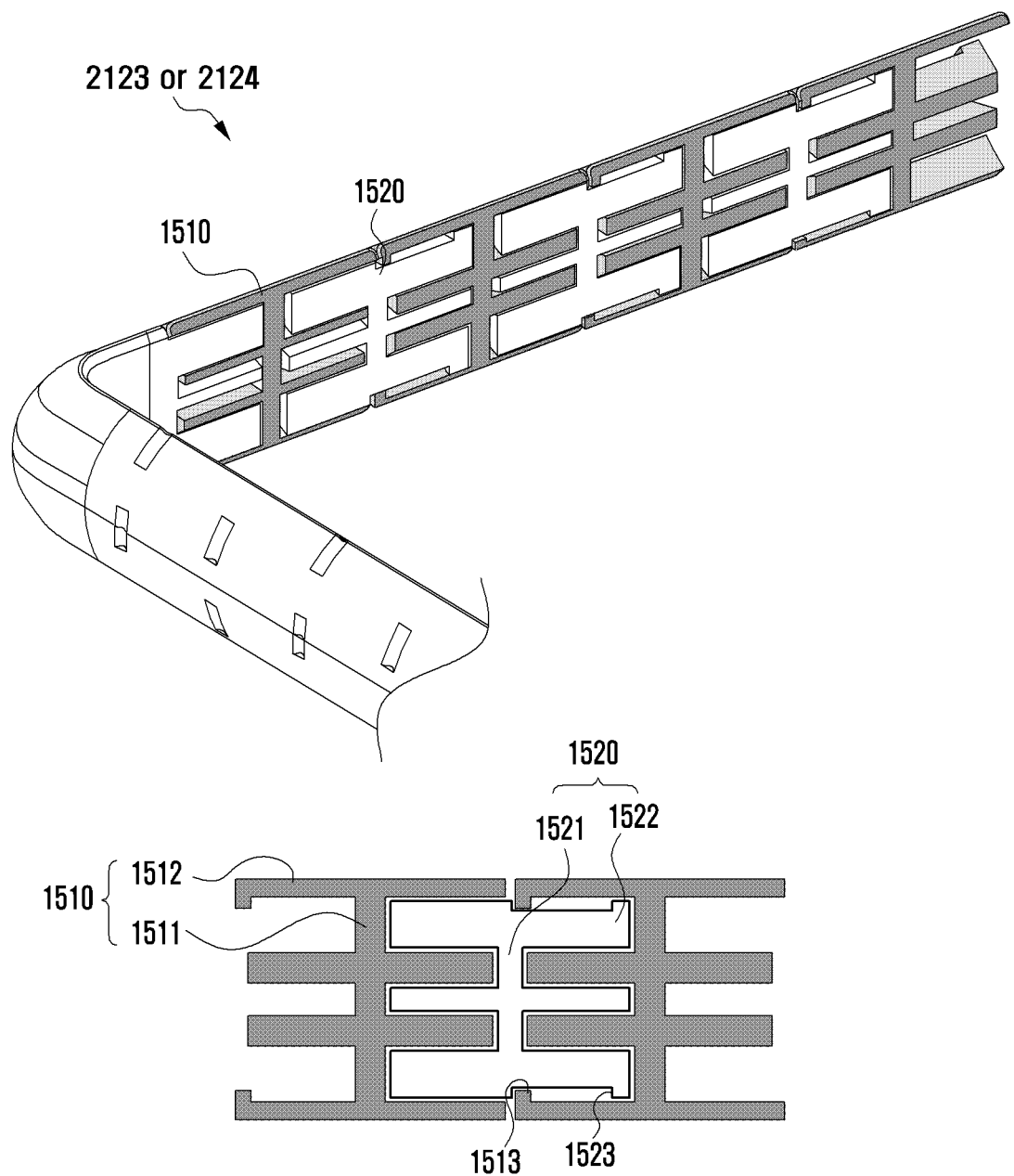
FIG. 15 is a view illustrating a coupling structure of a third side cover or a fourth side cover when an electronic device according to an embodiment is in a contracted state.
Figure 16:
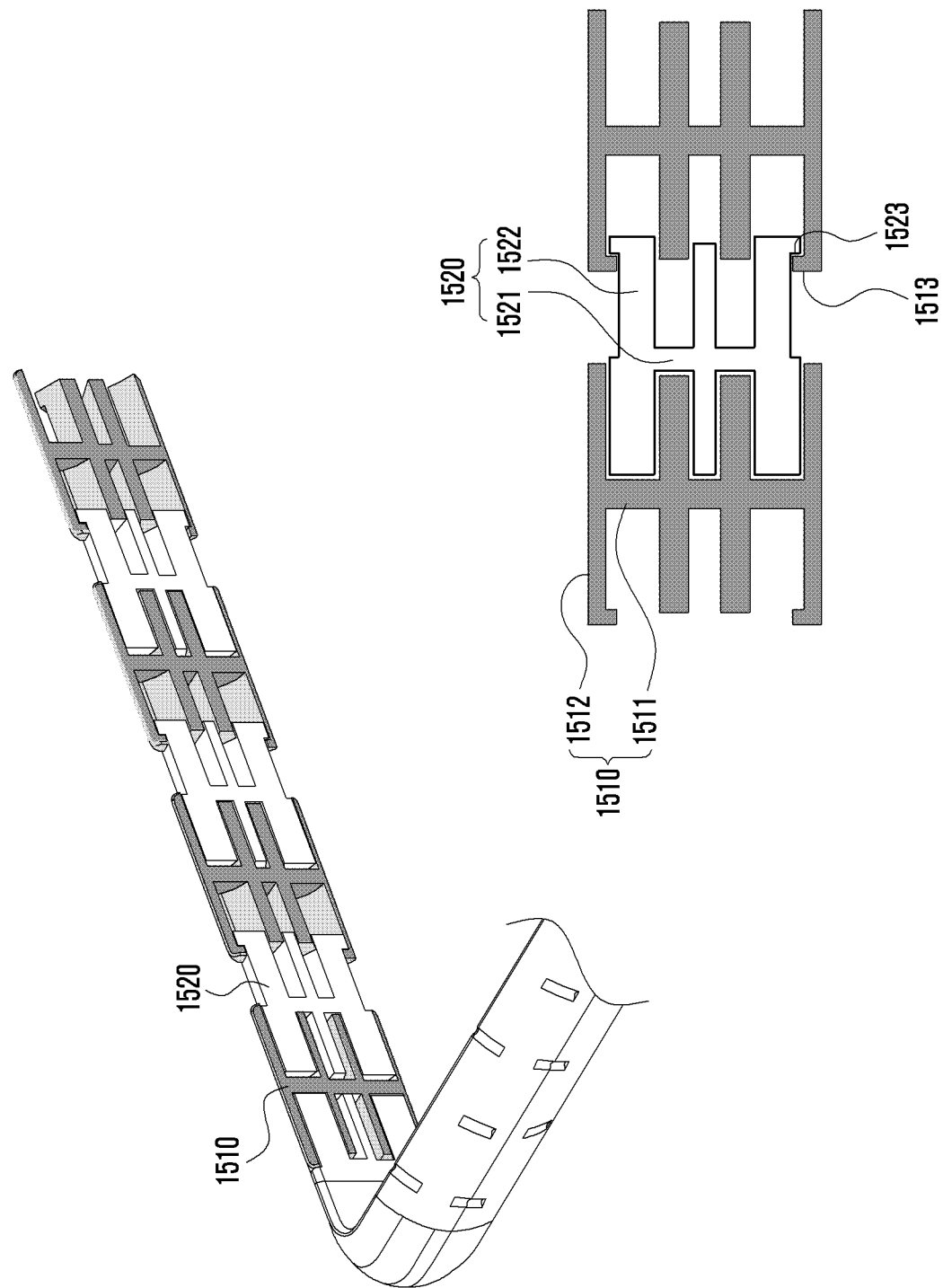
FIG. 16 is a view illustrating a coupling structure of a third side cover or a fourth side cover when an electronic device according to an embodiment is in an expanded state.

FIG. 15 is a view illustrating a coupling structure of a third side cover 2123 and/or a fourth side cover 2124 when an electronic device 101 according to an embodiment is in a contracted state. FIG. 16 is a view illustrating a coupling structure of a third side cover 2123 or a fourth side cover 2124 when an electronic device 101 according to an embodiment is in an expanded state.

Referring to FIG. 15 and FIG. 16, in an embodiment, the third side cover 2123 may include a plurality of coupling members 1510 and 1520 which can be coupled to or detached from one another in a sliding member.

The third side cover 2123 may include a first coupling member 1510 and a second coupling member 1520, wherein the first coupling member 1510 and the second coupling member 1520 may be alternately arranged at the side surface of the electronic device 101. In an embodiment, the first coupling member 1510 and the second coupling member 1520 may be coupled to or detached from each other in a sliding manner.

In an embodiment, the first coupling member 1510 may include a vertical support 1511 formed in a vertical direction and a plurality of horizontal supports 1512. The plurality of horizontal supports 1512 extend in left and right directions from the vertical support 1511. The second coupling member 1520 may also include a vertical support 1521 and a plurality of horizontal supports 1522 similar to the first coupling member 1510. The horizontal supports 1512 and horizontal supports 1522 interlock and are horizontally slidable with respect to each other. The horizontal sliding is restricted by protrusion 1513, and step 1523. In an embodiment, the horizontal supports 1512 of the first coupling member 1510 may move between the horizontal supports 1522 of the second coupling member 1520 in a sliding manner.

In an embodiment, a step 1523 may be formed at one of the horizontal supports 1522 of the second coupling member 1520, and the first coupling member 1510 may include a protrusion 1513 which comes into contact with the step 1523 when the electronic device 101 is in the expanded state (e.g., the state in FIG. 4). For example, as illustrated in FIG. 16, when the electronic device 101 is in the expanded state (e.g., the state in FIG. 4), the protrusion 1513 of the first coupling member 1510 may come into contact with the step 1523 of the second coupling member 1520 to function as a stopper configured to prevent the first coupling member 1510 and the second coupling member 1520 from being completely detached.

In an embodiment, the fourth side cover 1214 may be provided in a structure substantially identical or similar to the third side cover 2123.

Figure 17:
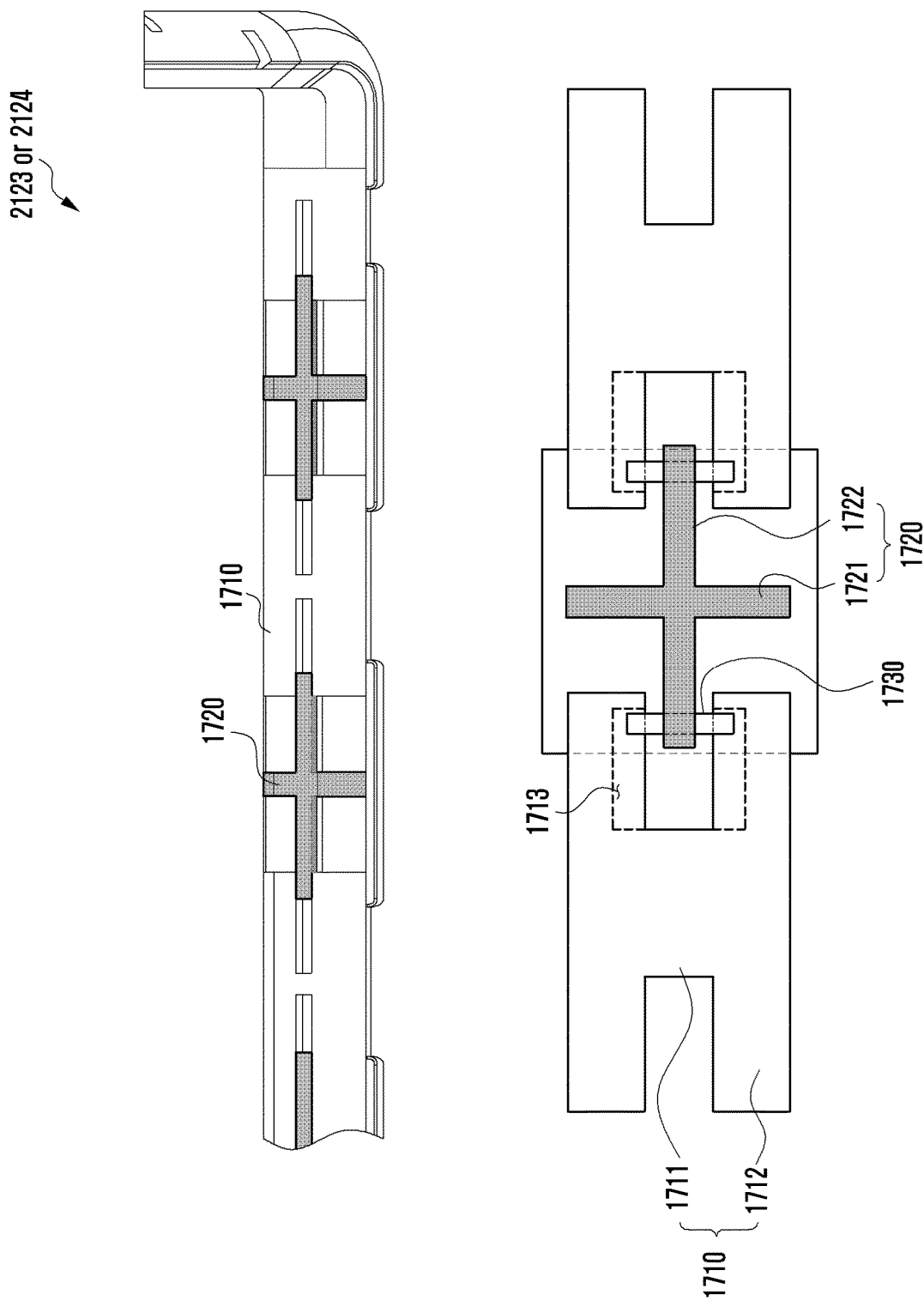
FIG. 17 is a view illustrating a coupling structure of a third side cover or a fourth side cover when an electronic device according to another embodiment is in a contracted state.
Figure 18:
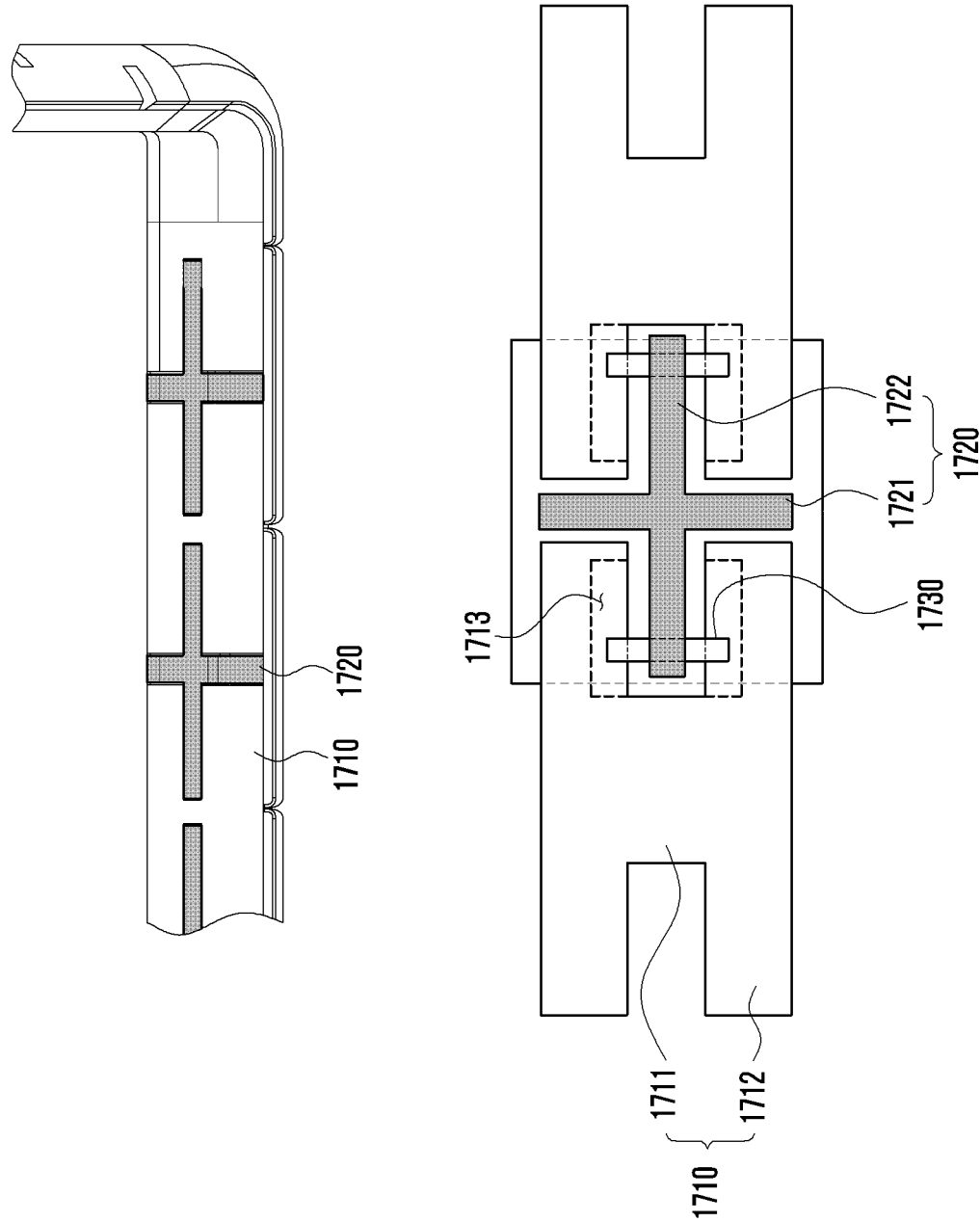
FIG. 18 is a view illustrating a coupling structure of a third side cover or a fourth side cover when an electronic device according to another embodiment is in an expanded state.

FIG. 17 is a view illustrating a coupling structure of a third side cover 2123 or a fourth side cover 2124 when an electronic device 101 according to another embodiment is in a contracted state. FIG. 18 is a view illustrating a coupling structure of a third side cover 2123 or a fourth side cover 2124 when an electronic device 101 according to another embodiment is in an expanded state.

Referring to FIG. 17 and FIG. 18, in another embodiment, the third side cover and/or fourth cover 2123, 2124 may include a first coupling member 1710 and a second coupling member 1720 which can be separate or compress from each other in a sliding manner, and may further include a fixing pin 1730 configured to prevent the first coupling member 1710 and the second coupling member 1720 from being completely detached. That is, the vertical support 1711 of the first coupling member 1710 and the vertical support 1721 of the second coupling member may come together to retract, or separate to expand. Full separation can be prevented by fixing pin 1730.

The first coupling member 1710 may include a vertical support 1711 formed in a vertical direction and a plurality of horizontal supports 1712 extending in left and right directions from the vertical support 1711. The second coupling member 1720 may also include a vertical support 1721 and a plurality of horizontal supports 1722 similar to the first coupling member 1710. In an embodiment, the horizontal supports 1722 of the second coupling member 1720 may move between the horizontal supports 1712 of the first coupling member 1710 in a sliding manner.

The fixing pin 1730 may be formed to extend through the horizontal support 1722 of the second coupling member 1720, and the horizontal support 1712 of the first coupling member 1710 may have a groove 1713 formed therein, which can accommodate the fixing pin 1730. In an embodiment, the groove 1713 of the first coupling member 1710 may be provided to have a predetermined width to allow the fixing pin 1730 to move when the electronic device 101 is switched to the contracted state (e.g., the state in FIG. 2) or the expanded state (e.g., the state in FIG. 4).

In an embodiment, the fourth side cover 2124 may be formed in a structure substantially identical or similar to the third side cover 2123.

An electronic device (e.g., 101 in FIG. 19) according to certain embodiments of the disclosure may include a housing 210 surrounding a side surface of the electronic device 101, a flexible display 220 exposed through a first surface of the electronic device 101 which faces a first direction, the exposed area varying based on the movement of the housing 210, and a flexible material 230 exposed through a second surface of the electronic device 101 which faces a second direction opposite to the first direction, the exposed area varying based on the movement of the housing 210, wherein the width of the flexible material 230 may expand in a fourth direction opposite to the third direction in accordance with the expansion of the width of the flexible display 220 in the third direction, and the third direction and the fourth direction may be perpendicular to the first direction and the second direction. The width of the flexible material 230 may contract in the third direction in accordance with the contraction of the width of the flexible display 220 in the fourth direction. The flexible material 230 may be one of EL lighting, a flexible display 220, a metallic film, fabric, or leather. The flexible display 220 may include a fixed area fixedly exposed through the first surface of the electronic device 101 regardless of the movement of the housing 210 and an expansion area retracted into the inner space of the electronic device 101 or ejected from a part of the housing 210 based on the movement of the housing 210, and the flexible material 230 may include a fixed area fixedly exposed through the second surface of the electronic device 101 regardless of the movement of the housing 210 and an expansion area retracted into the inner space or ejected from a part of the housing 210 based on the movement of the housing 210, wherein a direction in which the expansion area of the flexible display 220 is ejected may be opposite to a direction in which the expansion area of the flexible material 230 is ejected. The housing 210 may include a side member including a first side member and a second side member which face each other, and a side cover encasing the side member at the outside, wherein the side cover may include a first side cover forming a first side surface of the electronic device 101, a second side cover forming a second surface of the electronic device 101 facing the first side surface, a third side cover which forms a third side surface connecting one side of the first side surface and one side of the second side surface and the length of which expands in the third direction or contracts in the fourth direction, and a fourth side cover which forms a fourth side surface of the electronic device 101 facing the third side cover and expands or contracts in a direction identical to the direction in which the third side cover moves. The third side cover and the fourth side cover may include a plurality of coupling members which can be coupled to or detached from each other in a sliding manner.

FIG. 19 is a view schematically illustrating a cross section of an electronic device according to another embodiment.

According to certain embodiments, the electronic device 101 of the disclosure is not limited to the shape and assembly illustrated in FIG. 2 to FIG. 5 but may be implemented by other shapes or other combinations and/or assemblies of components. For example, as illustrated in FIG. 19, in the electronic device 101 according to another embodiment, a direction in which the flexible display 220 is retracted or ejected may differ from a direction in which the flexible material 230 is retracted or ejected. In the electronic device 101 according to another embodiment, the expansion area (e.g., 2202 in FIG. 3) of the flexible display 220 may be disposed to be adjacent to the first side cover 2121 forming the first side surface of the electronic device 101, may be ejected from the first side cover 2121 based on the fact that the first side cover 2121 moves in the fourth direction (the x2 direction in FIG. 2), and may be retracted into a space 1901 based on the fact that the first side cover 2121 moves in the third direction (the x1 direction in FIG. 2).

In the electronic device 101 according to another embodiment, the expansion area (e.g., 2302 in FIG. 3) of the flexible material 230 may be disposed to be adjacent to the second side cover 2122 forming the second side surface of the electronic device 101, may be ejected from the second side cover 2122 based on the fact that the second side cover 2122 moves in the third direction (the x1 direction in FIG. 2), and may be retracted into a space based on the fact that the second side cover 2122 moves in the fourth direction (the x2 direction in FIG. 2).

Parts or components not described in the electronic device 101 illustrated in FIG. 19 may be substantially identical or similar to at least a part of assemblies or shapes illustrated in FIG. 2 to FIG. 5. For example, the electronic device 101 illustrated in FIG. 19 may further include at least a part of shapes and assemblies illustrated in FIG. 2 to FIG. 5.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Although certain embodiments of the disclosure have been described with a certain degree of particularity, it shall be understood that the disclosure is not limited to the foregoing embodiments. Moreover, those skilled in the art will understand that revisions may be made, certain features omitted, and other features added without departing from the spirit and scope of the disclosure. Accordingly, the disclosure is only limited by the following claims and equivalents thereof.

The invention claimed is:

1. An electronic device comprising:
a housing surrounding at least a side surface of the electronic device;
a flexible display exposed through a first surface of the electronic device facing a first direction, an area of exposed flexible display varying based on movement of the housing; and
a flexible material exposed through a second surface of the electronic device facing a second direction opposite to the first direction, the area of the exposed flexible material varying based on the movement of the housing,
wherein a width of the flexible material that is exposed through the second surface, expands in a third direction in accordance with an expansion of the width of the flexible display in the third direction, the third direction being substantially perpendicular to the first direction and the second direction, and
wherein the housing includes:
a side member including a first side member and a second side member facing each other; and
a side cover encasing the side member at the outside, and wherein the side cover includes;
a first side cover forming a first side surface of the electronic device;
a second side cover forming a second surface of the electronic device facing the first side surface;
a third side cover which forms a third side surface connecting one side of the first side surface and one side of the second side surface, and a length of which expands in the third direction or contracts in a fourth direction; and
a fourth side cover which forms a fourth side surface of the electronic device facing the third side cover and expands or contracts in a direction identical to the direction in which the third side cover moves.

2. The electronic device of claim 1, wherein the width of the flexible material contracts in a fourth direction, wherein the fourth direction is opposite to the third direction, when the width of the flexible display contracts.

3. The electronic device of claim 1, wherein the flexible material is one of electroluminance (EL) lighting, a flexible display, a metallic film, fabric, or leather.

4. The electronic device of claim 1, wherein the flexible display includes a fixed area fixedly exposed through the first surface of the electronic device, and an expansion area configured to be either retracted into an inner space of the electronic device or ejected from a part of the housing when the housing is moved,
wherein the flexible material includes a fixed area fixedly exposed through the second surface of the electronic device, and an expansion area configured to be either retracted into the inner space or ejected from a part of the housing based on the movement of the housing, and
wherein a direction in which the expansion area of the flexible display is ejected is substantially identical to a direction in which the expansion area of the flexible material is ejected.

5. The electronic device of claim 4, further comprising:
a motor disposed in the inner space;
a plate disposed in the inner space having a gear rail;
a motor disposed in the inner space, the motor having a gear in contact with the gear rail of the plate;
a side holder coupled to the motor and configured to move by rotation of the gear; and a first rolling plate configured to move the expansion area of the flexible display in accordance with the movement of the side holder.

6. The electronic device of claim 5, wherein the first rolling plate is configured to eject the expansion area of the flexible display when the side holder moves in the third direction, and
retracts the expansion area of the flexible display into the inner space when the side holder moves in a fourth direction, wherein the fourth direction is substantially opposite to the third direction.

7. The electronic device of claim 5, further comprising:
a wire disposed in the inner space and connected to the expansion area of the flexible display; and
a reel member disposed in the inner space and configured to pull the wire in a fourth direction, wherein the fourth direction is substantially opposite to the third direction.

8. The electronic device of claim 5, further comprising a second rolling plate configured to move the expansion area of the flexible material in accordance with the movement of the side holder.

9. The electronic device of claim 8, wherein the second rolling plate is configured to eject the expansion area of the flexible material when the side holder moves in the third direction, and
wherein the second rolling plate is configured to retract the expansion area of the flexible material into an inner space when the side holder moves in a fourth direction, wherein the fourth direction is substantially opposite to the third direction.

10. The electronic device of claim 1, wherein the third side cover and the fourth side cover include a plurality of coupling members which can be coupled to or separated from each other in a sliding manner.

11. The electronic device of claim 10, wherein the plurality of coupling members include a first coupling member and a second coupling member which are alternately arranged,
wherein the first coupling member includes a vertical support formed in a vertical direction, and a plurality of horizontal supports extending in left and right directions from the vertical support,
wherein the second coupling member includes a vertical support formed in the vertical direction, and a plurality of horizontal supports extending in the left and right directions from the vertical support, and
wherein the horizontal supports of the first coupling member move between the horizontal supports of the second coupling member in a sliding manner.

12. The electronic device of claim 11, wherein a step is formed at at least one of the horizontal supports of the second coupling member, and
wherein a protrusion which comes into contact with the step when a width of the flexible display expands in the third direction is formed at the first coupling member, thereby restricting sliding.

13. The electronic device of claim 11, further comprising:
a fixing pin extending through the horizontal support of the second coupling member; and
a groove formed at the horizontal support of the first coupling member to accommodate the fixing pin.

14. An electronic device comprising:
a housing surrounding at least a side surface of the electronic device;
a flexible display exposed through a first surface of the electronic device which faces a first direction, an exposed area of the flexible display varying based on movement of the housing; and
a flexible material exposed through a second surface of the electronic device which faces a second direction opposite to the first direction, an exposed area of the flexible material configured to vary based on the movement of the housing,
wherein a width of the flexible material expands in a fourth direction substantially opposite to a third direction in accordance with an expansion of the width of the flexible display in the third direction, the third direction and the fourth direction being substantially perpendicular to the first direction and the second direction, and
wherein the housing includes:
a side member including a first side member and a second side member facing each other; and
a side cover encasing the side member at the outside, and wherein the side cover includes;
a first side cover forming a first side surface of the electronic device;
a second side cover forming a second surface of the electronic device facing the first side surface;
a third side cover which forms a third side surface connecting one side of the first side surface and one side of the second side surface, and a length of which expands in the third direction or contracts in a fourth direction; and
a fourth side cover which forms a fourth side surface of the electronic device facing the third side cover and expands or contracts in a direction identical to the direction in which the third side cover moves.

* * * * *